United States Patent Office 3,247,143
Patented Apr. 19, 1966

3,247,143
PREPARATION OF GLYCIDYL ESTER
COPOLYMERS IN ALCOHOLS
John E. Masters and Darrell D. Hicks, Louisville, Ky., assignors, by mesne assignments, to Celanese Coatings Company, a corporation of Delaware
No Drawing. Filed Nov. 9, 1962, Ser. No. 236,727
7 Claims. (Cl. 260—23)

This invention is a continuation-in-part of our application Serial No. 859,164, filed December 14, 1959, now abandoned.

This invention relates to the polymerization of unsaturated glycidyl esters, such as glycidyl acrylate, glycidyl maleate, and the like, with compounds copolymerizable therewith contining a single double bond, that is, monoethylenically unsaturated monomers. The invention relates particularly to the formation of glycidyl ester copolymer solutions which can be used in the preparation of molded articles, castings, and in the formation of other shaped articles.

Polymers and copolymers of unsaturated glycidyl esters are well known. They are prepared by polymerizing the glycidyl ester either alone or with other polymerizable compounds, generally in an emulsion system or in the presence of a volatile solvent such as ketone, aromatics and esters.

In emulsion polymerization, the drying of the coagulum is difficult because of the great tendency of the polymer to coalesce. Subsequently, mastication with cross-linking agents is also difficult. Accordingly, emulsion polymerized glycidyl ester copolymers are generally used as film-forming materials rather than in pottings, castings and the like.

Solution polymerization of glycidyl esters has the disadvantage that resulting polymer or copolymer solutions do not lend themselves to the formation of molded articles because of the difficulty of removing the solvent. Even when a low boiling solvent such as acetone is used and the product is subjected to vacuum distillation, it is difficult to form castings free of entrained solvent or of bubbles resulting from solvent liberation. The fact that polymers of this type must be made in solvents has prohibited an extensive use of glycidyl ester polymers in the pottings and castings fields.

By the practice of this invention, a process is provided for the preparation of solutions of glycidyl ester polymers for applications heretofore not practical through the use of polymer solutions. In accordance with the invention, the monomers are polymerized in the presence of a reactive solvent. By "reactive solvent" is meant a non-volatile solvent in which the polymer is soluble under polymerization conditions and which reacts with the polymer and/or a cross-linking agent for the polymer under curing conditions, that is, at curing temperatures, and if necessary, in the presence of a catalyst. It is understood, of course, that under polymerizing conditions, the solvent and the monomers are substantially non-reactive with each other. In other words, the polymerization medium is a solvent which does not react with the monomer or the polymer during polymerization, but which reacts either with the polymer or a cross-linking agent or both when the temperature is raised above the polymerization temperature generally in the presence of a catalyst.

Polymer solutions are thus formed which can be mixed with cross-linking agents to form cured compositions without the need for solvent liberation. This not only renders the polymer solutions particularly suitable for pottings, castings and encapsulations but also provides a convenient reaction medium for making high polymers which otherwise would be of little value in the pottings, castings, encapsulations etc. fields because of their extreme viscosities.

Reactive solvents which are employed in accordance with the practice of this invention are compositions including mono- and poly- hydric alcohols, each boiling at 150° C. or above and each being liquid at the polymerization temperature employed; that is, they have melting points below the polymerization temperature used, generally 60° C. to 150° C. The viscosity of the solvent should not be greater than 130 centipoises at the polymerization temperature. Of alcohols serving as reactive solvents, monohydric alcohols are suitable, but polyhydric alcohols are preferred. Monohydric alcohols which are used in accordance with the invention are those which cannot be readily liberated by heating the polymer after it is made, such as capryl alcohol, stearyl alcohol, lauryl alcohol and the like. Generally saturated aliphatic alcohols having over six carbon atoms such as hexyl alcohol, 2-ethyl-hexyl alcohol, nonyl alcohol, cetyl alcohol, dodecanol, tetradecanol, and the like will be most used. While saturated alcohols are usually employed, it is noted that whether unsaturated alcohols are usable depends on the reactivity of the double bond under polymerization conditions. Thus, long chain unsaturated alcohols such as oleyl alcohol, linoleyl alcohol, recinoleyl alcohol, and linolenyl alcohol can be used. It is understood that the alcohols as used herein include both the monohydric alcohols and the monohydric ether alcohols. Thus, the commercially available "Cellosolves" and "Carbitols" boiling above 150° C. are used herein. These compositions are the reaction products of monohydric alcohols with ethylene and propylene oxides such as 1-hexoxy-2-ethanol, and ethoxy ethanol.

Of the alcohols, saturated polyhydric alcohols are preferred which in admixture with the monomers form at the reaction temperature liquid solutions having viscosities not exceeding 130 centipoises. Particularly suitable are the high molecular weight glycols, however, the glycols, glycerin, sorbitol, trimethylol propane and the like can be used. Suitable glycols are, for instance, ethylene glycol, propylene glycol, diethylene glycol, 1-5-pentanediol, tripropylene glycol, dipropylene glycol, tetraethylene glycol, triethylene glycol, xylylene glycol, dihydroxy ethyl ethers of bisphenol, etc. Glycols as used herein also include both the dihydric alcohols and the dihydric ether alcohols. Thus, the commercially available "Carbowaxes" are contemplated. Thsee are mixtures of polyoxyethylene glycols. Those mixtures having average molecular weights of from 200 to 1000 are particularly desirable. The polyoxypropylene glycols are also contemplated.

In one embodiment of the invention, the alcohol can be used in admixture with epoxy compositions having 1,2-epoxy groups. Examples of monoepoxide polymerization media are such monoepoxides as styrene oxide, glycidol, phenyl glycidyl ether, glycidyl acetate, glycidyl benzoate, butyl glycidyl ether, vinylcyclohexene monoxide, 1,4-dichloro-2,3-epoxybutane, dipentene monoxide, and the like.

Among the polyepoxides, preferred epoxides are glycidyl polyethers of polyhydric alcohols and polyhydric phenols prepared by reacting the alcohol or phenol with a halohydrin such as epichlorhydrin in the presence of an alkali. These are the well-known ethoxyline resins and are described in such patents as U.S. 2,467,171, U.S. 2,538,072, U.S. 2,582,985, U.S. 2,615,007, U.S. 2,698,315, U.S. 2,581,464. In addition to glycidyl ethers, epoxy esters are included. Desirable epoxy esters can be made by the epoxidation of unsaturated esters by reaction with a peracid such as peracetic acid or performic acid, a desirable ester thus prepared being, 3,4-epoxy-6-methylcyclohexylmethyl - 3,4-epoxy-6-methylcyclohexanecarboxylate,

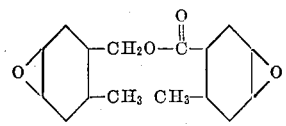

Epoxidized drying oils are also included, for example, epoxidized esters of the polyethylenically unsaturated monocarboxylic acids, such as epoxidized linseed, soybean, perilla, and the like. Another class of epoxy esters includes epoxidized derivatives of polyethylenically unsaturated polycarboxylic acids such as, for example, dimethyl 8,9,12,13-diepoxyeicosanedioate, dibutyl 7,8-11,12-diepoxyoctadecanedioate, etc.

Another group comprises the epoxidized polyethylenically unsaturated hydrocarbons, such as epoxidized 2,2-bis(2-cyclohexenyl) propane, epoxidized vinyl cyclohexene, and epoxidized dimer of cyclopentadiene. The invention also contemplates epoxidized polymers and copolymers of diolefins, such as butadiene. Examples of this include, among others, butadiene-acrylonitrile copolymers (Hycar rubbers), butadiene-styrene copolymers and the like.

In the case of the reaction media, it is necessary only that the alcohol or the alcohol-epoxide mixture have a viscosity of not more than 130 centipoises at the polymerization temperature. The solvent is a low melting compound which will be liquid at the polymerization temperature. The reactive solvents set forth make excellent reaction media. In some cases upon cooling, crystalline solids result which can be readily liquified on heating. If desired, the solid polymer-solvent compositions can be pulverized for convenience in use.

Methods of preparing glycidyl ester copolymers are well known and need not be discussed at length herein. One method involves making the glycidyl ester first, such as glycidyl acrylate, and polymerizing this compound by itself or with another monomer. Polymerization is effected by conventional solution polymerization techniques using ionic or free radical catalysis, in either case, the reactive solvent serving as an inert reaction medium. Thus, when the reaction medium is a low molecular weight material, less will be required when a more viscous high molecular weight composition is used. In addition, if a low molecular weight polymer is made, not as much medium is required as when a higher molecular weight polymer is prepared. This being the case, it can best be stated that sufficient polymerization medium is used to form, at the reaction temperature, a solution of the resulting copolymer in the polymerization medium. From 5 to 95 parts glycidyl ester, preferably 10 to 50, are reacted with 90 to 50 parts comonomer, the polymerization reaction being carried out at temperatures of from 60° C. to 150° C., and in some cases, if desired, at a pressure slightly above atmospheric. The polymerization reaction is, of course, accelerated by the use of heat and other conditions such as ionic or free radical catalysts, e.g., benzoyl peroxide, cumene hydroperoxide, tertiarybutyl hydroperoxide, phthalic peroxide, acetyl peroxide, lauroyl peroxide, ditertiarybutyl peroxide, aluminum chloride, stannic chloride, boron trifluoride, etc.

Preferred glycidyl ester copolymers prepared according to the present invention are formed by reacting a polymerizable monoethylenically monounsaturated monomer with a glycidyl ester having the following formula,

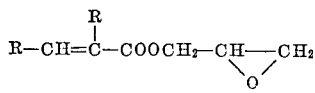

where R is a hydrogen or methyl radical. Examples of preferred glycidyl esters are glycidyl acrylate, glycidyl crotonate, and glycidyl methacrylate. While glycidyl acrylate, methacrylate and crotonate are preferred, it is known that glycidyl ester copolymers can be made from glycidyl maleates, fumarates and itaconates. It is to be recognized, of course, that these glycidyl esters of unsaturated dicarboxylic acids are not used with equivalent results. More discretion must be used in the selection of comonomer, and copolymer yield is usually lower. Using the acrylates and methacrylates, a wider latitude of polymers is possible, and in general products are more resistant to solvents than those made from glycidyl esters of dicarboxylic acids. There are, however, instances when one skilled in the art will prefer to make one of the known glycidyl maleate or fumarate copolymers following the teachings of this invention. The term glycidyl maleate, as used herein, includes mixed esters as well as diesters or diglycidyl maleates. Mixed esters refer to maleates having one alkyl ester group and one glycidyl ester group. The invention thus contemplates, in addition to the preferred glycidyl acrylates, methacrylates and crotonates, the use of diglycidyl maleate, diglycidyl fumarate, diglycidyl itaconate, methyl glycidyl maleate, octyl glycidyl fumarate, hexyl glycidyl itaconate and stearyl glycidyl maleate.

Polymerized with the glycidyl ester is a monoethylenically unsaturated monomer free of substituents reactive with epoxide groups. By a monoethylenically unsaturated monomer is intended an organic compound containing a single vinyl, vinylidene or vinylene group. Preferred monomers are liquids containing a vinyl group attached to a negative radical which are compatible with the glycidyl ester and soluble in the epoxide reactive solvent.

Such monomers being well known, the following is only a partial list of suitable monoethylenically unsaturated compounds:

Monoolefinic aromatic hydrocarbons, that is, monomers containing only atoms of hydrogen and carbon, such as styrene, alpha-methyl styrene, alpha-ethyl styrene, alpha-butyl styrene and vinyl toluene, and the like;

Halogenated monoolefinic aromatic hydrocarbons, that is, monomers containing carbon, hydrogen and one or more halogen atoms such as alpha-chlorostyrene, alpha-bromo-styrene, 2,5-dichlorostyrene, 2,5-dibromostyrene, 3,4-dichlorostyrene, 3,4-difluorostyrene, ortho-, meta-, and para-fluorostyrenes, 2,6-dichlorostyrene, 2,6-difluorostyrene, 3-fluoro-4-chlorostyrene, 3-chloro-4-fluorostyrene, 2,4,5-trichlorostyrene, dichloromonofluorostyrenes, and the like;

Esters of organic and inorganic acids such as vinyl acetate, vinyl propionate, vinyl butyrate, vinyl isobutyrate, vinyl valerate, vinyl caproate, vinyl enanthate, vinyl benzoate, vinyl toluate, vinyl p-chlorobenzoate, vinyl o-chlorobenzoate, vinyl m-chlorobenzoate and similar vinyl halobenzoates, vinyl p-methoxybenzoate, vinyl o-methoxybenzoate, vinyl p-ethoxybenzoate, methyl methacrylate, ethyl methacrylate, propyl methacrylate, butyl methacrylate, amyl methacrylate, hexyl methacrylate, heptyl methacrylate, octyl methacrylate, decyl methacrylate, methyl crotonate, ethyl crotonate and ethyl tiglate, methyl acrylate, ethyl acrylate, propyl acrylate, isopropyl acrylate, butyl acrylate, isobutyl acrylate, amyl acrylate, hexyl acrylate, 2-ethyl-hexyl acrylate, heptyl acrylate, octyl acrylate, 3,5,5-trimethylhexyl acrylate, decyl acrylate and dodecyl acrylate, isopropenyl acetate, isopropenyl propionate, isopropenyl butyrate, isopropenyl isobutyrate, isopropenyl valerate, isopropenyl caproate, isoproenyl enanthate, isopropenyl benzoate, isopropenyl p-chlorobenzoate, isopropenyl o-bromobenzoate, isopropenyl m-chlorobenzoate, isopropenyl toluate, isopropenyl alpha-bromopropionate;

Vinyl alpha-chloroacetate, vinyl alpha-bromoacetate, vinyl alpha-chloropropionate, vinyl alpha-bromopropionate, vinyl alpha-iodopropionate, vinyl alpha-chlorobutyrate, vinyl alpha-chlorovalerate and vinyl alpha-bromovalerate;

Allyl chlorocarbonate, allyl formate, allyl acetate, allyl propionate, allyl butyrate, allyl valerate, allyl caproate, allyl 3,5,5-trimethylhexoate, allyl benzoate, allyl chloroacetate, allyl trichloroacetate, allyl chloropropionate, allyl chlorovalerate, allyl lactate, allyl pyruvate, allyl aminoacetate, allyl acetoacetate, allyl thioacetate, as well as methallyl esters corresponding to the above allyl esters, as well as esters from such alkenyl alcohols as beta-ethyl allyl alcohol, beta-propyl allyl alcohol, 1-buten-4-ol, 2-methyl-buten-1-ol-4, 2-(2,2-dimethylpropyl)-1-buten-4-ol and 1-pentene-4-ol;

Methyl alpha-chloroacrylate, methyl alpha-bromoacrylate, methyl alpha-fluoroacrylate, methyl alpha-iodoacrylate, isopropyl alpha-bromoacrylate, amyl alpha-chloroacrylate, octyl alpha-chloroacrylate, 3,5,5-trimethylhexyl alpha-chloroacrylate, decyl alpha-chloroacrylate, methyl alpha-cyano acrylate, ethyl alpha-cyano acrylate, amyl alpha-cyano acrylate and decyl alpha-cyano acrylate;
alpha-cyano acrylate and decyl alpha-cyano acrylate;

Dimethyl maleate, diethyl maleate, dimethyl fumarate, and diethyl glutaconate;

Organic nitriles such as acrylonitrile, methacrylonitrile, ethacrylonitrile, crotonitrile, and the like;

Amides such as acrylamide, alpha-methyl acrylamide, N-phenyl acrylamide, N-methyl, N-phenyl acrylamide and the like.

In the formation of shaped articles from the copolymer solutions of this invention, the glycidyl ester copolymer in the epoxide reactive solvent is heated with a cross-linking agent such as an amino-amide, an anhydride, a polyisocyanate, or a $BF_3$ catalyst in an amount sufficient to form the cross-linked product. In other words, any of the well known curing agents for epoxide resins can be used, for instance, acids, anhydrides, amines, and $BF_3$ complexes; such as oxalic acid, phthalic anhydride, maleic anhydride, hexahydrophthalic anhydride, pyromellitic dianhydride, aliphatic amines such as diethylene triamine, ethylene diamine, triethylene tetramine, dimethylamino propylamine, modified amines such as the amino-amides, amine ethylene oxide adduct, tertiary amines such as triethylamine, trimethylamine, aromatic amines such as methylene dianiline, benzyl dimethylamine and dimethyl aminomethyl phenol, as well as quaternary ammonium salts such as benzyltrimethylammonium chloride, benzyltriethylammonium chloride, benzyltrimethylammonium bromide, benzyltrimethylammonium acetate, polytrimethylammonium chloride, benzyltrimethylammonium phosphate and trimethylammonium lactate and the like. The amount of cross-linking agent or epoxy converter as it may be called, depends upon whether the converter is a cross-linking agent or a catalyst accelerating cross-linking. Catalysts such as benzyltrimethylammonium chloride and the $BF_3$ complexes are generally employed in small amounts such as 0.1 to 10 percent. On the other hand, materials such as anhydrides and acids which react with the glycidyl ester copolymer or the reactive solvent to bring about cross-linking are used in larger quantities, generally equivalent or nearly equivalent amounts. A desirable cross-linking agent of this type is a carboxy copolymer. This can be made in a reactive solvent according to our copending application Serial No. 788,046, filed Jan. 21, 1959, now abandoned, and the two solutions can be combined on the basis of one carboxy equivalent of the carboxy copolymer per epoxide equivalent of the glycidyl ester copolymer solutions. By a carboxy equivalent copolymer is meant an amount, in grams, of copolymer containing one carboxyl group, whereas by an epoxide equivalent of copolymer solution is meant the amount of copolymer-diluent combination which contains one epoxide group.

The converters having both catalytic and chemical action such as amines can be employed in small or large quantities, say 0.1 percent based on the ester copolymer-epoxide mixture to one amino group per epoxide group in the mixture.

While the process for preparing glycidyl ester copolymers in reactive diluents is believed novel, it is also believed that the resulting compositions of matter are new, that is, a glycidyl ester copolymer composition which is devoid of conventional volatile solvent having been provided for use in the plastics field.

There is provided a glycidyl ester copolymer in homogenous admixture with a strongly polar medium having a viscosity of less than 130 centipoises at 150° C. which is reactive with the glycidyl ester polymer and, if not, with a cross-linking agent, the medium being a mono- or di-hydric alcohol. These compositions can be made not only by the process of this invention but by conventional means. When conventional polymerization methods are employed, the solvent must be distilled off or otherwise replaced with the reactive medium.

The invention can perhaps be more fully understood by reference to the following examples, the polyglycols being the commercially available mixtures of polyethylene glycols and of polypropylene glycols. Hence, the molecular weights given are average molecular weights of the respective mixtures. The examples are, of course, for the purpose of illustration only and they are not intended to limit the invention.

EXAMPLE 1

| Materials | Units | Weight (grams) |
|---|---|---|
| Vinyl Toluene | 62.1 | 124.2 |
| Glycidyl Methacrylate | 37.9 | 75.8 |
| Benzoyl Peroxide | 2.0 | 4.0 |
| Polypropylene Glycol (Molecular Weight 750) | | 200.0 |

Part A

In a one liter, three-necked, round-bottomed flask fitted with an agitator, thermometer, and dropping funnel, the 200 grams of polypropylene glycol are heated to 125° C. In an Erlenmeyer flask, the vinyl toluene, glycidyl methacrylate and catalyst are stirred until complete solution results. This monomer-catalyst solution is then introduced into the flask containing the heated glycol solvent dropwise through the dropping funnel during the ensuing hour while the temperature of the flask contents is maintained at 125° C. to 135° C. After all of the monomer-catalyst solution is added, the flask contents are heated at 122° C. for a period of four and one-half hours. The resulting product is a 50 percent solution of a 62.1/37.9 vinyl toluene/glycidyl methacrylate copolymer in polypropylene glycol. The copolymer component of the solution has a theoretical epoxide equivalent of 375 while the total solution has a theoretical epoxide equivalent of 750.

Part B

In a suitable container 20.0 grams of the copolymer solution of Part A are combined with 4.3 grams of phthalic anhydride. The mixture is heated with stirring until the phthalic anhydride is melted. The mixture gels about 30 to 45 seconds after the phthalic anhydride melts. The resulting gel when further heated at 180° C. for three and one-half hours in a circulating oven yields a very flexible, tough casting.

EXAMPLE 2

| Materials | Units | Weight (grams) |
|---|---|---|
| Vinyl Toluene | 50.0 | 100.0 |
| Glycidyl Methacrylate | 50.0 | 100.0 |
| Benzoyl Peroxide | 2.0 | 4.0 |
| Polyethylene Glycol (Molecular Weight 300) | | 200.0 |

In accordance with Example 1, 200 grams of polyethylene glycol are heated to 125° C. in a one liter flask. In an Erlenmeyer flask the vinyl toluene, glycidyl methacrylate and catalyst are stirred until complete solution results. This monomer-catalyst solution is then introduced into the flask containing the heated glycol solvent dropwise through the dropping funnel during the ensuing hour while the temperature of the flask contents is maintained at 125° C. to 135° C. After all of the monomer-catalyst solution is added, the flask contents are held at 135° C. to 145° C. for an additional three and one-half hours. The resulting product is a 50 percent solution of a 50/50 vinyl toluene/glycidyl methacrylate copolymer in polyethylene glycol. The copolymer component of the composition has a theoretical epoxide equivalent of 284, while the total solution has a theoretical epoxide equivalent of 568.

EXAMPLE 3

| Materials | Units | Weight (grams) |
|---|---|---|
| Vinyl Toluene | 45.5 | 91.0 |
| Glycidyl Methacrylate | 54.5 | 109.0 |
| Benzoyl Peroxide | 2.0 | 4.0 |
| Polypropylene Glycol (Molecular Weight 750) | | 100.0 |
| Butyl Glycidyl Ether | | 100.0 |

Part A

Following the procedure of Example 1, 100 grams of the polypropylene glycol and 100 grams of butyl glycidyl ether are heated in a one liter flask to 120° C. At this temperature, the monomer-catalyst solution, prepared by combining the vinyl toluene, glycidyl methacrylate, and benzoyl peroxide, is added to the heated solvent mixture over a period of one hour and at a temperature of 120° C. to 130° C. When all of the monomer-catalyst solution has been added, the temperature of the reaction mixture is gradually increased (but not allowed to exceed 142° C.) for an additional four hours. The resulting product is a 50 percent solution of a 45.5/54.5 vinyl toluene/glycidyl methacrylate copolymer in a 50/50 mixture of butyl glycidyl ether and polypropylene glycol, the 50 percent solution having a viscosity of $Z_4$ (Gardner-Holdt). The copolymer component of the composition has a theoretical epoxide equivalent of 261. The total solution also has a theoretical epoxide equivalent of 261.

Part B

In accordance with Part B of Example 1, 10 grams of the copolymer solution of Part A and 3.3 grams of methyl endo-cis-bicyclo[2,2,1]-5-heptene-2,3-dicarboxylic anhydride are heated with stirring until the mixture has melted. As a catalyst, .16 gram of dimethyl aminomethyl phenol is added to the mixture. The mixture when heat cured for one hour at 100° C. followed by a three hour post-cure at 180° C. yields a very tough casting having good hardness and flexibility properties.

EXAMPLE 4

| Materials | Units | Weight (grams) |
|---|---|---|
| Vinyl Toluene | 52.5 | 105.0 |
| Glycidyl Methacrylate | 47.5 | 95.0 |
| Benzoyl Peroxide | 2.0 | 4.0 |
| Polypropylene Glycol (Molecular Weight 750) | | 100.0 |
| 3,4-epoxy-6-methylcyclohexylmethyl-3,4-epoxy-6-mehtylcyclohexane carboxylate (Epoxide A) | | 100.0 |

Part A

In the manner described in Example 1, the polypropylene glycol and epoxide A are heated together in a one liter flask to 125° C. At this temperature, the monomer-catalyst solution, prepared by combining the vinyl toluene, glycidyl methacrylate, and benzoyl peroxide, is added to the heated diluent through a dropping funnel over a period of one hour at a temperature of 125° C. to 130° C. When all the monomer-catalyst solution has been added, the flask contents are heated for an additional four hours at 120° C. to 130° C. The resulting product is a 50 percent solution of a 52.5/47.5 vinyl toluene/glycidyl methacrylate copolymer in a 50/50 mixture of epoxide A and polypropylene glycol. The theoretical epoxide equivalent of the copolymer component of the composition is 300. The total solution also has a theoretical epoxide equivalent of 300.

Part B

In accordance with Part B of Example 1, 10.0 grams of the copolymer solution of Part A and 6.7 grams of methyl endo-cis-bicyclo[2.2.1]-5-heptene-2,3-dicarboxylic anhydride are heated with stirring until the mixture has melted. As a catalyst, .16 gram of dimethyl aminomethyl phenol is added. The mixture when heat cured for one hour at 100° C. followed by a three hour post cure at 180° C. yields a flexible casting having excellent hardness and toughness properties.

What is claimed is:

1. A process for preparing glycidyl ester copolymer solutions which comprises
   (A) Forming a solution of
      (1) An unsaturated glycidyl ester monomer, wherein said monomer is glycidyl acrylate, glycidyl methacrylate, glycidyl crotonate, glycidyl maleate, glycidyl fumarate, glycidyl itaconate, or mixtures thereof;
      (2) A different monoethylenically unsaturated monomer free of substituents reactive with 1,2-epoxy groups copolymerizable therewith, in
      (3) A solvent which is a monohydric alcohol having more than six carbon atoms, a polyhydric alcohol, or a mixture of said alcohol with an epoxide solvent compound having at least one 1,2-epoxy group and being free from ethylenical unsaturation capable of polymerization with the unsaturated groups of the monomers, said solvent being a solvent for the unsaturated monomers and for the polymerization product of the unsaturated monomers;
   (B) Heating the solution at a temperature below about 150° C. in the absence of a non-reactive solvent and a solvent volatile below 150° C. to polymerize a glycidyl ester monomer and the different unsaturated monomer to form a glycidyl ester copolymer dissolved in said solvent, said monomer-alcohol solution having a viscosity not exceeding 130 centipoises at the reaction temperature used to effect the polymerization of the monomers.

2. The process of claim 1 in which the solvent has a boiling point above 150° C.

3. The process of claim 1 in which the solution polymerization is conducted at about 60° C. to about 150° C.

4. The process of claim 1 in which the polymerization is promoted with a vinyl polymerization catalyst.

5. The process of claim 1 in which the solvent is a mixture of an alcohol and polyglycidyl ether of a polyhydric phenol.

6. The process of claim 1 in which the solvent reaction medium is a glycol having a molecular weight below 1000.

7. The process of claim 5 in which the alcohol is a glycol having a molecular weight below 600 and the polyglycidyl ether is the diglycidyl ether of a dihydric phenol.

References Cited by the Examiner

UNITED STATES PATENTS

| | | | |
|---|---|---|---|
| 2,824,083 | 2/1958 | Parry et al. | 260—33.4 |
| 2,830,038 | 4/1958 | Pattison | 260—77.5 |
| 2,949,445 | 8/1960 | Blake | 260—33.4 |
| 3,000,848 | 9/1961 | McGary et al. | 260—37 |

LEON J. BERCOVITZ Primary Examiner.